United States Patent
Min et al.

(10) Patent No.: US 10,899,392 B2
(45) Date of Patent: Jan. 26, 2021

(54) SIDE SILL STRUCTURE OF VEHICLE MOUNTED WITH OPPOSITE SLIDING DOORS

(71) Applicants: Hyundai Motor Company, Seoul (KR); Kia Motors Corporation, Seoul (KR)

(72) Inventors: Huen-Sick Min, Hwaseong-si (KR); Sang-Gil Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/394,900

(22) Filed: Apr. 25, 2019

(65) Prior Publication Data
US 2020/0223490 A1 Jul. 16, 2020

(30) Foreign Application Priority Data
Jan. 14, 2019 (KR) .................. 10-2019-0004766

(51) Int. Cl.
*B62D 25/02* (2006.01)
*B62D 27/02* (2006.01)

(52) U.S. Cl.
CPC .......... *B62D 25/025* (2013.01); *B62D 27/02* (2013.01)

(58) Field of Classification Search
CPC .............................. B62D 25/025; B62D 27/02
USPC ............................ 296/209, 187.12, 29, 205
See application file for complete search history.

(56) References Cited

U.S. PATENT DOCUMENTS

| 4,582,357 A | * | 4/1986 | Nakamura | B62D 25/025 296/155 |
| 6,183,039 B1 | * | 2/2001 | Kohut | E05D 15/1081 296/146.12 |
| 6,899,374 B1 | * | 5/2005 | Heard | B60J 5/047 296/155 |
| 7,520,557 B2 | * | 4/2009 | Yoshida | B60J 5/06 296/146.6 |
| 2006/0028056 A1 | * | 2/2006 | Aizawa | B60R 13/04 296/209 |
| 2014/0232132 A1 | * | 8/2014 | Kwon | B60J 5/06 296/155 |

(Continued)

FOREIGN PATENT DOCUMENTS

| EP | 1092574 A1 | 4/2001 |
| EP | 1741619 A1 | 1/2007 |
| JP | 2005001473 A | 1/2005 |

(Continued)

*Primary Examiner* — Jason S Morrow
*Assistant Examiner* — E Turner Hicks
(74) *Attorney, Agent, or Firm* — Slater Matsil, LLP (57) ABSTRACT

A side sill structure can be used with a vehicle mounted with opposite sliding doors. The vehicle includes a lower rail that is mounted at a lower side of a vehicle body in a front-rear direction of the vehicle body. The side sill structure includes a side sill that includes a side sill inner panel and a side sill outer panel coupled to define an opened cross section. The side sill inner panel is mounted on the vehicle body and extends in the front-rear direction. The side sill outer panel is coupled to the side sill inner panel to define a hollow portion between the side sill outer panel and the side sill inner panel. The side sill structure also includes a lower rail accommodating unit that is coupled to the side sill.

20 Claims, 7 Drawing Sheets

(56) References Cited

U.S. PATENT DOCUMENTS

2019/0135349 A1* 5/2019 Nusier ................. B62D 25/025
2019/0383077 A1* 12/2019 Rodermund ........ E05D 15/1047

FOREIGN PATENT DOCUMENTS

| JP | 2013256202 A | 12/2013 |
| KR | 101382777 B1 | 4/2014 |

* cited by examiner

SIDE SILL STRUCTURE OF VEHICLE MOUNTED WITH OPPOSITE SLIDING DOORS

CROSS-REFERENCE TO RELATED APPLICATIONS

This application claims priority to Korean Patent Application No. 10-2019-0004766, filed in the Korean Intellectual Property Office on Jan. 14, 2019, which application is hereby incorporated herein by reference.

TECHNICAL FIELD

The present invention relates to a side sill structure of a vehicle mounted with opposite sliding doors.

BACKGROUND

Figure 1:
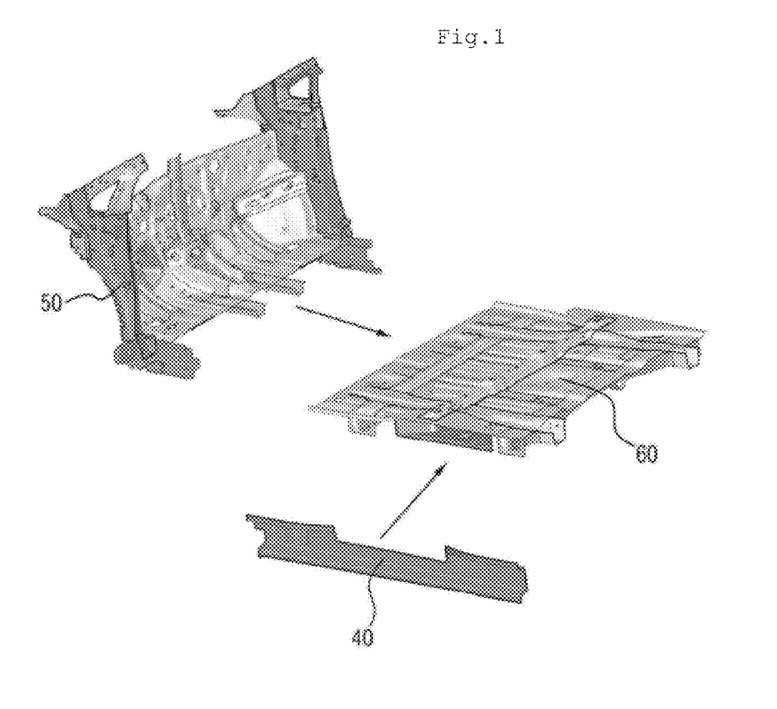
FIG. 1 is a view illustrating a side sill that connects a front panel and a floor panel.

Referring to FIG. 1, a side sill 40 refers to a member which is disposed at a lower side of a vehicle body below a door and disposed in a front-rear direction of a vehicle body. The side sill 40 connects a front panel 50 at a front side of a vehicle and a floor panel 60 that defines a floor of the vehicle body.

Recently, to optimize conditions that allow occupants to get in or out of narrow spaces in the vehicles and to cope with the introduction of autonomous vehicles, sliding doors have been developed, and side sill structures corresponding to the sliding doors are being developed.

Figure 2A:
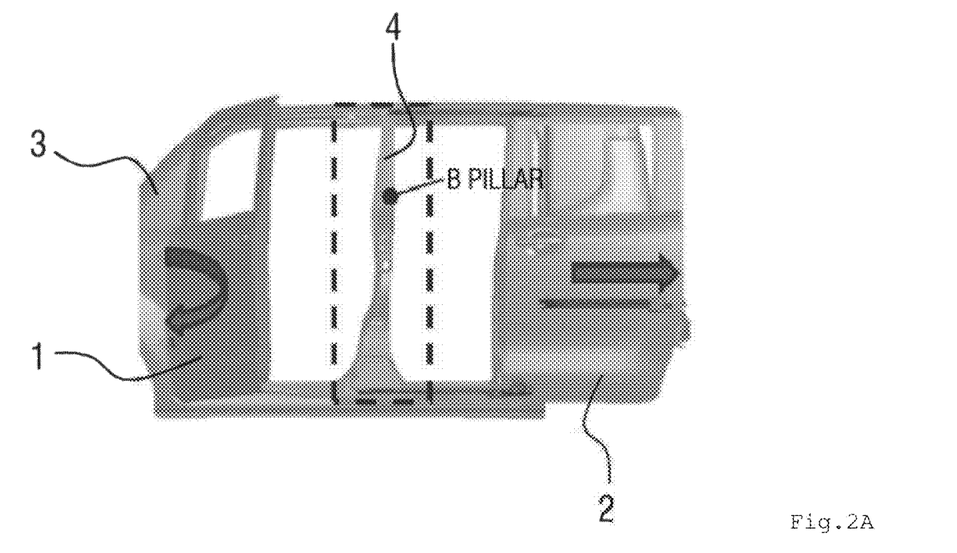
FIG. 2A is a view illustrating a vehicle in which a swing type front door and a sliding type rear door are mounted.

Referring to FIG. 2A, in openings of a vehicle body 3 of a vehicle produced recently, swing type doors are mounted as front doors 1, sliding type doors are mounted only as rear doors 2, and B pillars 4 are mounted between the front doors 1 and the rear doors 2 in order to maintain collision rigidity of the vehicle.

Figure 2B:
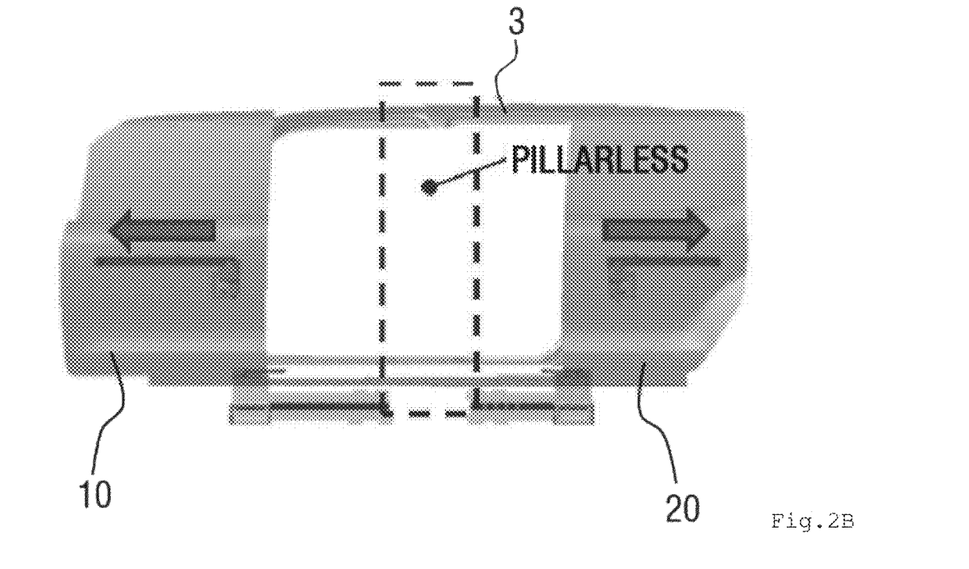
FIG. 2B is a view illustrating a vehicle in which opposite sliding doors which include sliding type front and rear doors are mounted.

However, as illustrated in FIG. 2B, there is a need for sliding doors including a front door 10 and a rear door 20 which are opened and closed in opposite directions in order to maximize the condition that allows the occupant to get in or out of the vehicle.

In this case, in order to maximally utilize the opening for the door, B-pillarless opposite sliding doors, from which the B pillars are omitted, may be mounted, and therefore, a structure of the side sill needs to be changed.

In this regard, Korean Patent No. 10-0852061 (Side Sill Structure for Vehicle) in the related art discloses a side sill structure of a vehicle in which in order to reduce a degree to which a lower end portion of a side sill of the vehicle in which no side sill molding is mounted is exposed to the outside, a lower end portion of a side sill outer reinforcement, which is positioned inside the side sill of the vehicle, is bent to have multiple steps, such that an end of a side sill outer panel is positioned on a bent protruding portion, and then the side sill outer panel is joined by laser welding, thereby minimize the degree to which the lower end portion of the side sill is exposed to the outside even though no side sill molding is mounted.

Figure 3:
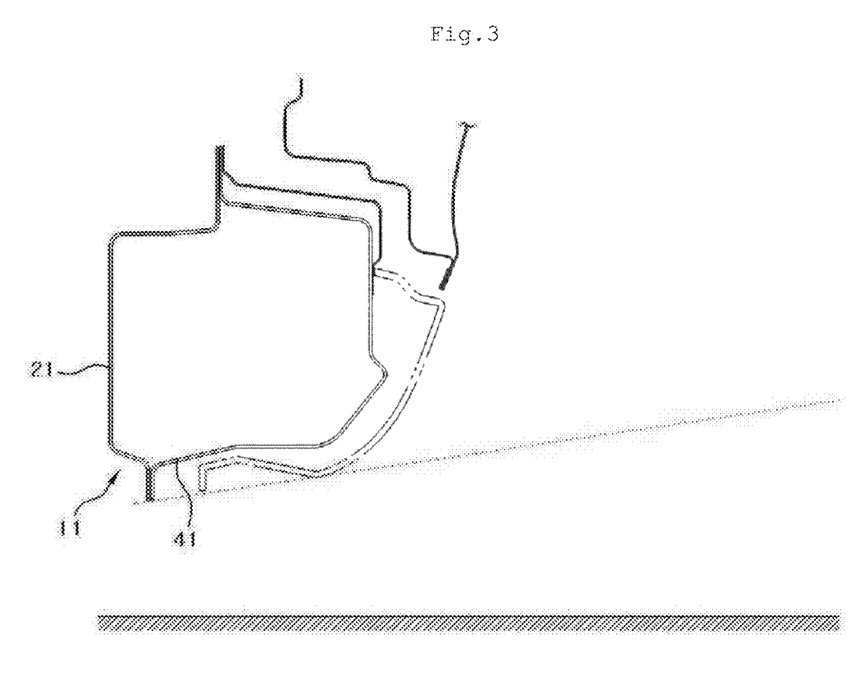
FIG. 3 is a view illustrating a side sill structure in the related art.

Referring to FIG. 3, a structure of a side sill 11 in the related art includes a side sill inner panel 21 which is coupled in a longitudinal direction of a vehicle body, and a side sill outer panel 41 which is coupled to the side sill inner panel 21 so as to define a box-shaped closed cross section.

However, in the related art, since the side sill inner panel 21 and the side sill outer panel 41 define the closed cross section, there is a problem in that there is no space for accommodating a lower rail which is mounted at a lower side of the vehicle body to implement the sliding doors which are opened and closed in the opposite directions.

Even though the side sill inner panel 21 and the side sill outer panel 41 are configured to define an opened cross section in order to mount the lower rail, there are problems in that connection rigidity and collision rigidity deteriorate at opened portions and foreign substances are drawn.

In a case in which the B pillar is omitted, there is a problem in that collision rigidity cannot be ensured in the event of a broadside collision.

Korean Patent No. 10-0852061 discloses subject matter related to subject matter disclosed herein.

SUMMARY

Embodiments of the present invention relate to a side sill structure of a vehicle mounted with opposite sliding doors which includes a lower rail mounted in a front-rear direction of the vehicle. Particular embodiments relate to a side sill structure in which a side sill lower reinforcement is coupled to and overlaps a side sill so as to define a closed cross section together with the side sill, at a lower end of a lower rail and the side sill having an opened cross section so as to enable the lower rail to be mounted, thereby improving collision rigidity and connection rigidity.

Embodiments of the present invention can provide a side sill structure in which a side sill lower reinforcement, which is configured to define a closed cross section together with a side sill, is coupled to and overlaps the side sill, at a lower end of a lower rail and the side sill having an opened cross section so as to enable the lower rail to be mounted at a lower side of a vehicle body in a side sill structure in the related art, such that the side sill structure has improved collision rigidity and connection rigidity so as to be applied even to B-pillarless opposite sliding doors.

An exemplary embodiment of the present invention provides a side sill structure of a vehicle mounted with opposite sliding doors which includes a lower rail which is mounted at a lower side of a vehicle body in a front-rear direction of the vehicle body. The side sill structure includes a side sill that includes a side sill inner panel that is mounted on the vehicle body and extends in the front-rear direction. A side sill outer panel is coupled to the side sill inner panel to define a hollow portion between the side sill outer panel and the side sill inner panel. A lower rail accommodating unit is coupled to the side sill and accommodates therein the lower rail, in which the side sill inner panel and the side sill outer panel are coupled to define an opened cross section.

The side sill structure may further include a side sill lower reinforcement which has one side that is coupled to and overlaps the lower rail accommodating unit, and the other side that is coupled to and overlaps the side sill outer panel.

The lower rail accommodating unit may further include an upper mounting reinforcement which is coupled to and overlaps a center floor panel and has a lower portion on which the lower rail is mounted and a lower mounting reinforcement which is bent to accommodate the lower rail and has one side that is coupled to and overlaps the side sill outer panel, and the other side that is coupled to and overlaps the upper mounting reinforcement.

The lower mounting reinforcement may be coupled to and may overlap the side sill lower reinforcement and may define a closed cross section together with the side sill.

The hollow portion may further include multiple bulkheads that support the side sill lower reinforcement.

The side sill lower reinforcement may have identical cross sections that extend in the front-rear direction so that the bulkheads are disposed at predetermined positions.

The lower mounting reinforcement and the side sill lower reinforcement may be welded in an H direction.

The side sill outer panel and the side sill lower reinforcement may be welded in an L direction.

The side sill and the side sill lower reinforcement may be welded in an L direction.

The lower rail and the upper mounting reinforcement may be coupled at a flat portion formed on the upper mounting reinforcement in an H direction.

The side sill inner panel, the side sill lower reinforcement, the lower mounting reinforcement, and the upper mounting reinforcement may be welded in an L direction.

The lower rail may be formed in a curved shape so that the door is moved toward an interior of the vehicle when the door is being closed.

The side sill inner panel may further include an extension portion which extends toward a center floor side member and is coupled to the center floor side member so that a center floor panel and the side sill inner panel define a closed cross section.

The extension portion and the center floor side member may be welded in an L direction.

According to the present invention having the aforementioned configuration, there is an advantage in that the cross section of the side sill may be opened to accommodate the lower rail mounted on the vehicle body.

According to the present invention, the side sill and the side sill lower reinforcement are mounted at a lower end of the lower rail so as to define the closed cross section, and as a result, there are advantages in that a collision performance is improved and foreign substances are prevented from being introduced into the side sill.

According to the present invention, the side sill, the side sill lower reinforcement, the upper mounting reinforcement, and the lower mounting reinforcement are coupled to one another by welding so as to overlap one another, and as a result, there are advantages in that connection rigidity may be improved, and a collision performance may be maintained even though the present invention is applied to B-pillarless opposite sliding doors having no B pillar.

According to the present invention, there is an advantage in that the extension portion may be formed on the side sill inner panel so as to accommodate the curved lower rail.

According to the present invention, the extension portion of the side sill inner panel and the center floor side member are coupled so that the behavior thereof is restricted in the L direction, and as a result, there is an advantage in that it is possible to prevent the side sill from rotating and to ensure collision rigidity in the event of a broadside collision of the vehicle.

DETAILED DESCRIPTION OF ILLUSTRATIVE EMBODIMENTS

Hereinafter, the present invention will be described in detail with reference to the accompanying drawings. However, the present invention is not restricted or limited by exemplary embodiments. Like reference numerals indicated in the respective drawings refer to members which perform substantially the same functions.

Figure 4:
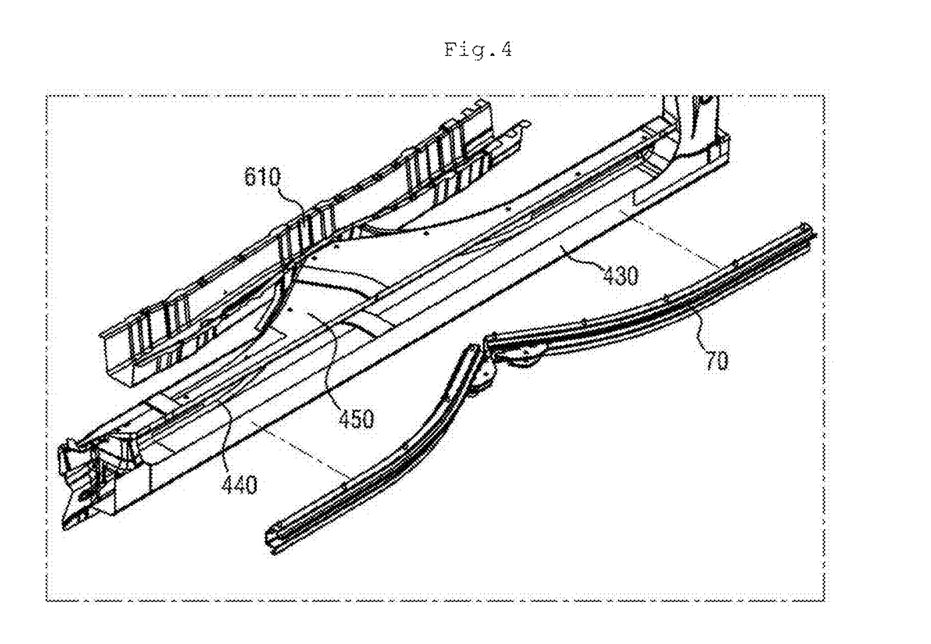
FIG. 4 is a view illustrating a state in which a lower rail is mounted on a side sill structure of a vehicle mounted with opposite sliding doors according to the present invention.

FIG. 4 is a view illustrating a state in which a lower rail 70 is mounted on a side sill structure of a vehicle mounted with opposite sliding doors according to the present invention.

Referring to FIG. 4, the side sill structure of the vehicle mounted with the opposite sliding doors according to the present invention may be mounted to define a structure in which a side sill lower reinforcement 430, a side sill inner panel 410, and an upper mounting reinforcement 450 are stacked.

The lower rail 70 may be mounted at one side of a side sill in a front-rear direction of a vehicle body at a lower side of the vehicle body, and a center floor side member 610, which is coupled to a floor panel, may be mounted at the other side of the side sill.

The pair of lower rails 70 may be mounted at the lower side of the vehicle body so as to correspond to a front door and a rear door, respectively. Lower rollers may be mounted on the front door and the rear door so as to correspond to the lower rails 70.

Like the lower rail 70, the side sill may extend in the front-rear direction of the vehicle body at a lateral side of the vehicle body.

Figure 5:
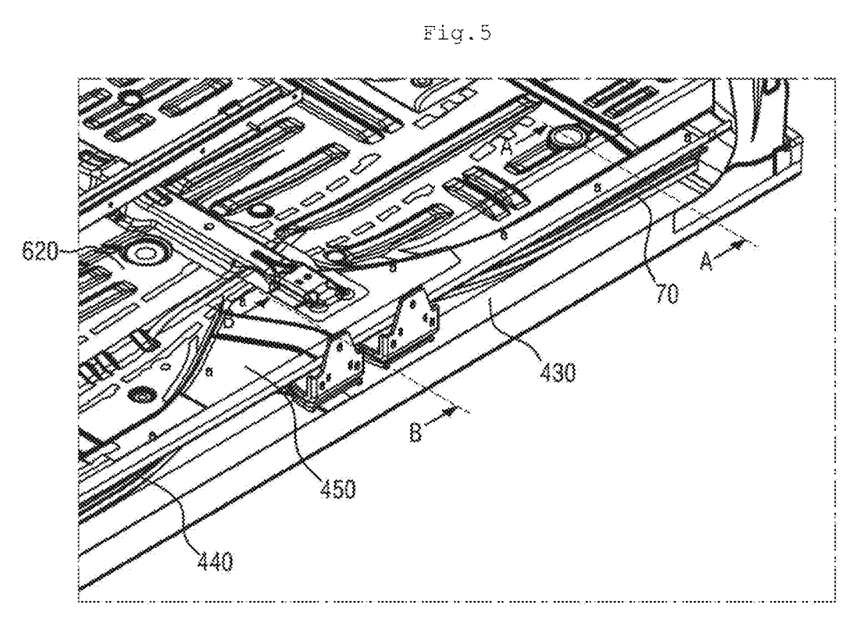
FIG. 5 is a view illustrating a state in which the lower rail is mounted on the side sill structure of the vehicle mounted with the opposite sliding doors according to the present invention.

FIG. 5 is a view illustrating a state in which the lower rail 70 is mounted on the side sill structure of the vehicle mounted with the opposite sliding doors according to the present invention.

Referring to FIG. 5, the lower rail 70 may be formed in a curved shape so that the door is moved toward the interior of the vehicle when the door is being closed, and the lower rail 70 may be accommodated in a lateral portion of the side sill.

A center floor panel 620 may be coupled to an upper portion of the lower rail 70 mounted at the lateral side of the side sill.

Figure 6:
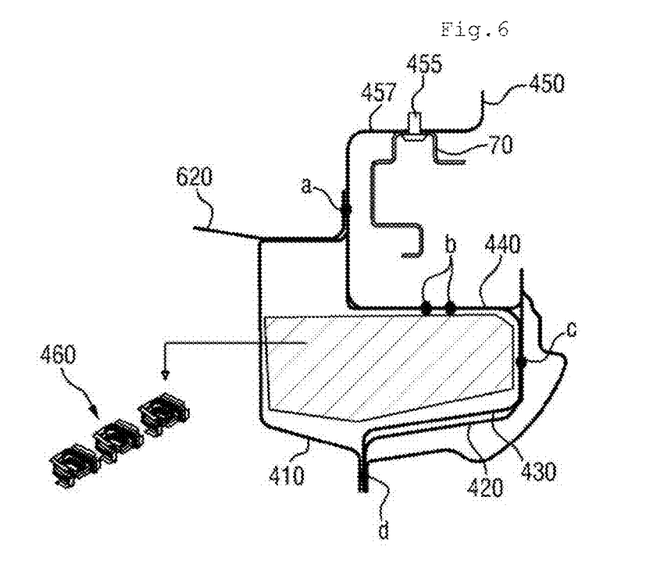
FIG. 6 is a cross-sectional view taken along line A-A in FIG. 5.

FIG. 6 is a cross-sectional view taken along line A-A in FIG. 5.

Referring to FIGS. 5 and 6, the side sill according to the present invention may include the side sill inner panel 410 and a side sill outer panel 420.

The side sill inner panel 410 may extend in the front-rear direction of the vehicle body. The side sill outer panel 420 may be coupled to the side sill inner panel 410 to define a hollow portion between the side sill outer panel 420 and the side sill inner panel 410.

The side sill inner panel 410 and the side sill outer panel 420 may define an opened cross section so as to accommodate the lower rail 70.

The side sill structure of the vehicle mounted with the opposite sliding doors according to the present invention may further include the side sill lower reinforcement 430, and a lower rail accommodating unit which accommodates the lower rail 70 therein and is coupled to the side sill.

The lower rail accommodating unit may include the upper mounting reinforcement 450 and a lower mounting reinforcement 440 which are coupled to accommodate the lower rail 70 therein.

The upper mounting reinforcement 450 is coupled to and overlaps the center floor panel 620, and the lower rail 70 may be mounted on a lower portion of the upper mounting reinforcement 450.

The lower mounting reinforcement 440 may be bent to accommodate the lower rail 70. One side of the lower mounting reinforcement 440 may be coupled to and may overlap the side sill outer panel 420, and the other side of the lower mounting reinforcement 440 may be coupled to and may overlap the upper mounting reinforcement 450.

Figure 7:
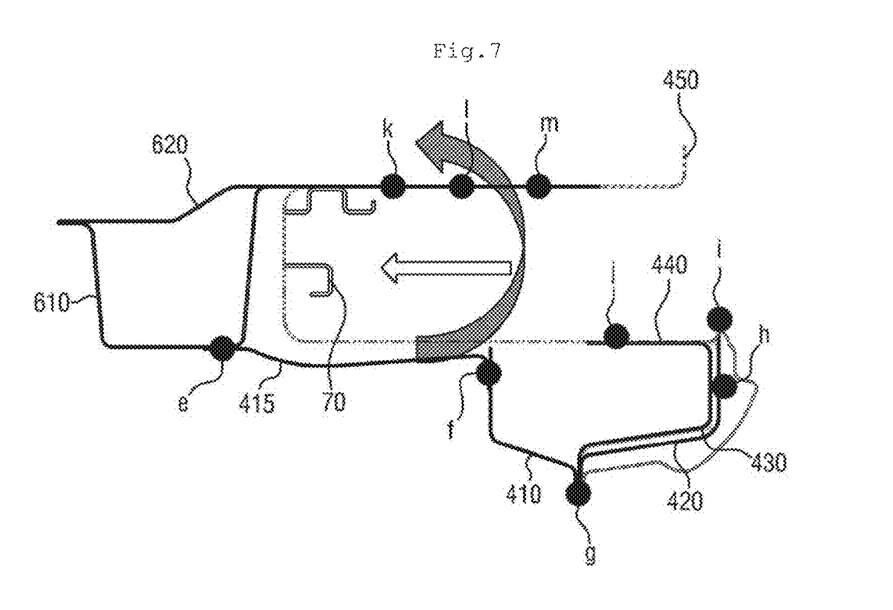
FIG. 7 is a cross-sectional view taken along line B-B in FIG. 5.

Referring to FIGS. 5 and 7, the lower rail 70 may be formed in a curved shape so that the door is moved toward the interior of the vehicle when the door is being closed, such that the lower rail accommodating unit may extend toward the interior of the vehicle so as to accommodate the lower rail 70 at a point at which the front door and the rear door are in contact with each other.

One side of the side sill lower reinforcement 430 may be coupled to and may overlap the lower rail accommodating unit, particularly, the lower mounting reinforcement 440, and the other side of the side sill lower reinforcement 430 may be coupled to and may overlap the side sill outer panel 420.

Since the side sill is formed to have the opened cross section, there is no concern that foreign substances are introduced into the side sill. In particular, in the case of B-pillarless opposite sliding doors having no B pillar, the side sill lower reinforcement 430 according to the present invention is mounted to compensate for deterioration in rigidity, thereby closing the opened cross section of the side sill and reinforcing rigidity of the side sill.

The side sill lower reinforcement 430 and the lower mounting reinforcement 440 are bent to define a closed cross section together with the side sill, thereby preventing foreign substances from being introduced into the side sill.

Since the side sill lower reinforcement 430 is coupled to and overlaps the side sill and the upper mounting reinforcement 450, connection rigidity is improved, and therefore, collision rigidity is improved in the event of a broadside collision of the vehicle.

The hollow portion formed in the side sill may further include multiple bulkheads 460 that support the side sill lower reinforcement 430.

The bulkhead 460 may support the side sill lower reinforcement 430 at a lower side of the side sill lower reinforcement 430, thereby preventing the side sill from collapsing due to external force in the event of a vehicle collision and compensating for rigidity of the side sill in the event of a collision in an L direction (vehicle width direction).

The side sill lower reinforcement 430 may have identical cross sections, which are continuously formed in the front-rear direction of the vehicle, so that the bulkheads 460 are disposed at desired and predetermined positions.

The present invention may further include the lower mounting reinforcement 440 in order to reinforce both coupling rigidity and collision rigidity of the side sill and the side sill lower reinforcement 430.

One side of the lower mounting reinforcement 440 may be coupled to and may overlap the side sill inner panel 410 and the upper mounting reinforcement 450, and the other side of the lower mounting reinforcement 440 may be coupled to and may overlap the side sill lower reinforcement 430.

Like the side sill lower reinforcement 430, the lower mounting reinforcement 440 may be bent to define a closed cross section together with the side sill and may be coupled to and may overlap the side sill lower reinforcement 430.

The lower rail 70 may be welded on the upper mounting reinforcement 450 in an H direction (up-down direction) and may be coupled to a flat portion 457 formed on the upper mounting reinforcement 450. In this case, the lower rail 70 and the upper mounting reinforcement 450 may be coupled by a bolt 455.

Since the lower rail 70 and the upper mounting reinforcement 450 are welded in the H direction, the rotations of the lower rail 70 and the upper mounting reinforcement 450 may be prevented even if the door is moved along the lower rail 70 in a T direction (front-rear direction of the vehicle).

The side sill inner panel 410, the side sill outer panel 420, the side sill lower reinforcement 430, the lower mounting reinforcement 440, and the upper mounting reinforcement 450 according to the present invention may be coupled to one another and overlap one another in order to improve connection rigidity and collision rigidity, and spot welding may be used as a coupling method.

The lower mounting reinforcement 440 and the side sill lower reinforcement 430 are welded at an upper side of the hollow portion (point b) so that the behavior thereof is restricted in the H direction. The side sill outer panel 420 and the side sill lower reinforcement 430 may be welded at point c so that the behavior thereof is restricted in the L direction.

The side sill and the side sill lower reinforcement 430 may be welded at point d so that the behavior thereof is restricted in the L direction. The side sill inner panel 410, the side sill lower reinforcement 430, the lower mounting reinforcement 440, and the upper mounting reinforcement 450 may be welded at an upper side of the side sill inner panel 410 (point a) so that the behavior thereof is restricted in the L direction.

FIG. 7 is a cross-sectional view taken along line B-B in FIG. 5.

Referring to FIGS. 5 and 7, since the lower rail 70 is formed in a curved shape so that the door is moved toward the interior of the vehicle when the door is being closed, the side sill inner panel 410, the upper mounting reinforcement 450, and the lower mounting reinforcement 440, which are configured to accommodate the lower rail 70, may extend toward the interior of the vehicle at the point at which the front door and the rear door are in contact with each other.

The side sill inner panel 410 may further include an extension portion 415 which extends toward the center floor side member 610 and is coupled to the center floor side member 610 so that a center floor and the side sill inner panel 410 define a closed cross section.

The extension portion 415 may be formed to be welded on the side sill inner panel 410 at point f.

The extension portion 415 and the center floor side member 610 may be welded at point e so that the behavior thereof is restricted in the L direction.

Since the extension portion 415 and the center floor side member 610 are welded, sealability is ensured between the side sill inner panel 410 and the center floor side member 610, such that it is possible to prevent foreign substances from being introduced into the lower portion of the side sill.

It is possible to ensure collision rigidity in the event of a broadside collision of the vehicle, and it is possible to prevent components including the side sill from rotating in the arrow direction.

The lower mounting reinforcement 440 and the side sill outer panel 420 may be welded at point i so that the behavior thereof is restricted in the L direction, and the center floor panel 620, the extension portion 415, and the upper mounting reinforcement 450 may be welded at point k so that the behavior thereof is restricted in the H direction.

The extension portion 415 and the upper mounting reinforcement 450 may be welded again at point 1 and point m so that the behavior thereof is restricted in the H direction in order to ensure connection rigidity and collision rigidity.

Like point b in FIG. 6, even at the point at which the front door and the rear door are in contact with each other, the lower mounting reinforcement 440 and the side sill lower reinforcement 430 may be welded at point j so that the behavior thereof is restricted in the H direction.

Like point c in FIG. 6, the side sill outer panel 420 and the side sill lower reinforcement 430 may also be welded at point h so that the behavior thereof is restricted in the L direction. Like point d in FIG. 6, the side sill and the side sill lower reinforcement 430 may be welded at point g so that the behavior thereof is restricted in the L direction.

Therefore, connection rigidity and collision rigidity in the vicinity of the front and rear sides of the side sill may be maintained even in the vicinity of a center of the side sill, that is, in the vicinity of a contact point between the front door and the rear door.

An object and an effect of the present invention may be naturally understood or may become clearer from the preceding description, and the object and the effect of the present invention are not restricted only by the following description. In addition, in the description of the present invention, the specific descriptions of publicly known technologies related with the present invention have been omitted when it is determined that the specific descriptions may unnecessarily obscure the subject matter of the present invention.

What is claimed is:

1. A side sill structure of a vehicle mounted with opposite sliding doors, the vehicle including a lower rail that is mounted at a lower side of a vehicle body in a front-rear direction of the vehicle body, the side sill structure comprising:
    a side sill that includes a side sill inner panel and a side sill outer panel coupled to define an opened cross section, the side sill inner panel being mounted on the vehicle body and extending in the front-rear direction, and the side sill outer panel being coupled to the side sill inner panel to define a hollow portion between the side sill outer panel and the side sill inner panel;
    a lower rail accommodating unit that is coupled to the side sill so that the side sill is accommodated in the lower rail; and
    a side sill lower reinforcement that has one side that is coupled to and overlaps the lower rail accommodating unit and another side that is coupled to and overlaps the side sill outer panel;
    wherein the lower rail accommodating unit comprises:
        an upper mounting reinforcement that is coupled to and overlaps a center floor panel and has a lower portion on which the lower rail is mounted; and
        a lower mounting reinforcement that is bent to accommodate the lower rail and has one side that is coupled to and overlaps the side sill outer panel, and another side that is coupled to and overlaps the upper mounting reinforcement.

2. The side sill structure of claim 1, wherein the lower rail and the upper mounting reinforcement are coupled at a flat portion formed on the upper mounting reinforcement in an H direction.

3. The side sill structure of claim 1, wherein the side sill inner panel, the side sill lower reinforcement, the lower mounting reinforcement, and the upper mounting reinforcement are welded in an L direction.

4. The side sill structure of claim 1, wherein the lower mounting reinforcement is coupled to and overlaps the side sill lower reinforcement and defines a closed cross section together with the side sill.

5. The side sill structure of claim 4, wherein the lower mounting reinforcement and the side sill lower reinforcement are welded in an H direction.

6. The side sill structure of claim 1, wherein the hollow portion further includes multiple bulkheads that support the side sill lower reinforcement.

7. The side sill structure of claim 6, wherein the side sill lower reinforcement has identical cross sections that extend in the front-rear direction so that the bulkheads are disposed at predetermined positions.

8. The side sill structure of claim 1, wherein the side sill outer panel and the side sill lower reinforcement are welded in an L direction.

9. The side sill structure of claim 1, wherein the side sill and the side sill lower reinforcement are welded in an L direction.

10. A side sill structure of a vehicle mounted with opposite sliding doors, the vehicle including a lower rail that is mounted at a lower side of a vehicle body in a front-rear direction of the vehicle body, the side sill structure comprising:
    a side sill that includes a side sill inner panel and a side sill outer panel coupled to define an opened cross section, the side sill inner panel being mounted on the vehicle body and extending in the front-rear direction, and the side sill outer panel being coupled to the side sill inner panel to define a hollow portion between the side sill outer panel and the side sill inner panel;
    a lower rail accommodating unit that is coupled to the side sill so that the side sill is accommodated in the lower rail, wherein the lower rail is formed in a curved shape so that the door is moved toward an interior of the vehicle when the door is being closed; and
    a side sill lower reinforcement that has one side that is coupled to and overlaps the lower rail accommodating unit and another side that is coupled to and overlaps the side sill outer panel;
    wherein the lower rail accommodating unit comprises:
        an upper mounting reinforcement that is coupled to and overlaps a center floor panel and has a lower portion on which the lower rail is mounted; and
        a lower mounting reinforcement that is bent to accommodate the lower rail and has one side that is coupled to and overlaps the side sill outer panel, and another side that is coupled to and overlaps the upper mounting reinforcement.

11. The side sill structure of claim 10, wherein the side sill inner panel further includes an extension portion that extends toward a center floor side member and is coupled to the center floor side member so that a center floor panel and the side sill inner panel define a closed cross section.

12. The side sill structure of claim 11, wherein the extension portion and the center floor side member are welded in an L direction.

13. A vehicle, the vehicle comprising:
a vehicle body that includes a front panel and a floor panel that defines a floor of the vehicle body;
a sliding door at a side of the vehicle;
a lower rail that is mounted at a lower side of the vehicle body in a front-rear direction of the vehicle body;
a side sill below the sliding door and connected to the front panel and to the floor panel, the side sill including a side sill inner panel and a side sill outer panel coupled to define an opened cross section, the side sill inner panel being mounted on the vehicle body and extending in the front-rear direction, and the side sill outer panel being coupled to the side sill inner panel to define a hollow portion between the side sill outer panel and the side sill inner panel;
a lower rail accommodating unit that is coupled to the side sill so that the side sill is accommodated in the lower rail; and
a side sill lower reinforcement that has one side that is coupled to and overlaps the lower rail accommodating unit and another side that is coupled to and overlaps the side sill outer panel;
wherein the lower rail accommodating unit comprises:
an upper mounting reinforcement that is coupled to and overlaps the floor panel and has a lower portion on which the lower rail is mounted; and
a lower mounting reinforcement that is bent to accommodate the lower rail and has one side that is coupled to and overlaps the side sill outer panel and another side that is coupled to and overlaps the upper mounting reinforcement.

14. The vehicle of claim 13, wherein the lower rail is formed in a curved shape so that the sliding door is moved toward an interior of the vehicle when the sliding door is being closed.

15. The vehicle of claim 13, wherein the lower rail and the upper mounting reinforcement are coupled at a flat portion formed on the upper mounting reinforcement in an H direction.

16. The vehicle of claim 13, wherein the side sill inner panel, the side sill lower reinforcement, the lower mounting reinforcement, and the upper mounting reinforcement are welded in an L direction.

17. The vehicle of claim 13, wherein the lower mounting reinforcement is coupled to and overlaps the side sill lower reinforcement and defines a closed cross section together with the side sill.

18. The vehicle of claim 13, wherein the hollow portion further includes multiple bulkheads that support the side sill lower reinforcement.

19. The vehicle of claim 13, wherein the side sill outer panel and the side sill lower reinforcement are welded in an L direction.

20. The vehicle of claim 13, wherein the side sill and the side sill lower reinforcement are welded in an L direction.

* * * * *